(12) United States Patent
Caron et al.

(10) Patent No.: US 11,604,096 B2
(45) Date of Patent: Mar. 14, 2023

(54) SLIT HOMOGENIZER FOR SPECTRAL IMAGING

(71) Applicant: Nederlandse Organisatie voor toegepast-natuurwetenschappelijk onderzoek TNO, 's-Gravenhage (NL)

(72) Inventors: Jerome Caron, Leiden (NL); Henri Johannes Petrus Vink, The Hague (NL)

(73) Assignee: Nederlandse Organisatie voor toegepast-natuurwentenschappelijk onderzoek TNO, 's-Gravenhage (NL)

( * ) Notice: Subject to any disclaimer, the term of this patent is extended or adjusted under 35 U.S.C. 154(b) by 6 days.

(21) Appl. No.: 17/262,568

(22) PCT Filed: Jul. 26, 2019

(86) PCT No.: PCT/NL2019/050500
§ 371 (c)(1),
(2) Date: Jan. 22, 2021

(87) PCT Pub. No.: WO2020/027657
PCT Pub. Date: Feb. 6, 2020

(65) Prior Publication Data
US 2021/0293623 A1    Sep. 23, 2021

(30) Foreign Application Priority Data

Jul. 30, 2018 (EP) .................................... 18186243

(51) Int. Cl.
*G01J 3/28*    (2006.01)
*G01J 3/02*    (2006.01)

(52) U.S. Cl.
CPC ............ *G01J 3/2823* (2013.01); *G01J 3/024* (2013.01); *G01J 3/0208* (2013.01); *G01J 3/0229* (2013.01); *G01J 3/2803* (2013.01)

(58) Field of Classification Search
CPC ... G01J 2003/2826; G01J 3/024; G01J 3/2823
See application file for complete search history.

(56) References Cited

U.S. PATENT DOCUMENTS

2012/0212737 A1    8/2012    Comstock, II et al.
2016/0209269 A1 *  7/2016    Desroches .............. G01J 3/024

FOREIGN PATENT DOCUMENTS

CN    104330896 A  *  2/2015    ................ G01J 3/04
EP    1793278 A2      6/2007
(Continued)

OTHER PUBLICATIONS

Pérez Albiñana, "Sentinel-5: the new generation European operational atmospheric chemistry mission in polar orbit", 2017 (Year: 2017).*

(Continued)

*Primary Examiner* — Maurice C Smith
(74) *Attorney, Agent, or Firm* — Leydig, Voit & Mayer, Ltd.

(57) ABSTRACT

A spectral imager (100) may use an entrance telescope (10) to spatially image an object (O1), at least in the across-slit direction (X), onto a physical slit (Se) of a spectrometer (20). The spectrometer (20) may include a slit homogenizer (24) such as a rod lens configured to spatially image an aperture stop (AS) in the across-slit direction (X) as a virtual slit image (Ih). Formation of a detection image (Id) which is spectrally resolved along a spectral axis (X') may includes spatially imaging the virtual slit image (Ih), at least in the across-slit direction (X), at a detector plane (Pd). This may achieve a more homogeneous illumination of the spectrometer slit and improve measurement accuracy and reproducibility.

21 Claims, 5 Drawing Sheets

(56) References Cited

FOREIGN PATENT DOCUMENTS

EP          2678648        1/2014
JP       2014-506679 A     3/2014
WO     WO 2012-115793 A1   8/2012

OTHER PUBLICATIONS

Morrissey, Patrick, "The Keck Cosmic Web Imager: a capable new integral field spectrograph for the W. M. Keck Observatory", 2012 (Year: 2012).*
European Patent Office, International Search Report in corresponding International Application No. PCT/NL2019/050500, dated Oct. 23, 2019 (3 pages).
Sierk, B et al., "Carbonsat instrument pre-developments: towards monitoring carbon dioxide and methane concentrations from space", Proceedings of SPIE; [Proceedings of SPIE ISSN 0277-786X vol. 10524], Sep. 25, 2017 SPIE, US—ISBN 978-1-5106-1533-5; ISBN 1-5106-1533-4, vol. 10562, pp. 105622C-105622C-9, XP060093814 (Sep. 25, 2017).
Guldimann Benedikt et al., "Smart slit assembly for high-resolution spectrometers in space", Proceedings of SPIE; [Proceedings of SPIE ISSN 0277-786X vol. 10524], Mar. 16, 2016 SPIE, US—ISBN 978-1-5106-1533-5 ; ISBN 1-5106-1533-4, vol. 9754, pp. 97540B-97540B-10, XP060069898 (Mar. 16, 2016).

* cited by examiner

SLIT HOMOGENIZER FOR SPECTRAL IMAGING

CROSS-REFERENCE TO RELATED APPLICATIONS

This patent application is a U.S. National Phase of PCT International Application No. PCT/NL2019/050500, filed Jul. 26, 2019, which claims priority to European Application No. 18186243.4, filed Jul. 30, 2018, which are both expressly incorporated by reference in their entireties, including any references contained therein.

TECHNICAL FIELD AND BACKGROUND

The present disclosure relates to the field of spectrometry and spectral imaging.

A spectral imager, also referred to as multispectral or hyper-spectral imager, can be used to obtain spatially resolved spectral information of an object or scene under investigation. Typically, in a spectral imager, light emitted or reflected by a given object or scene is imaged onto the entrance of a spectrometer, usually a slit element that transmits a single line image of the object or scene. For example, the object is imaged onto the slit by an entrance telescope. The spectrometer in turn re-images this light to another location while decomposing this light according to its wavelength in a direction orthogonal to the orientation of the slit element (across-slit direction), where it can be observed or recorded by a detector. In some cases, each line image of the object or scene is decomposed into a two-dimensional data array, and by scanning the object or scene in line-by-line increments, a three-dimensional data-array can be formed. For example, a satellite with a spectral imager may collect spectral information from regions of the Earth by collecting the spectrum along different slices while orbiting.

The accuracy and reproducibility of measurement in a spectrometer or spectral imager may rely on the assumption that the spectrometer entrance slit is illuminated uniformly. In practice, when a spectrometer is used to analyze some optical signal it is not always possible to achieve this condition. For example, in remote-sensing applications such as measurement of Earth radiance from space, it can be a problem and a source of measurement error.

SUMMARY

Aspects of the present disclosure relate to a spectral imager and corresponding method. The spectral imager may use a physical slit and entrance optics, to spatially image at least one direction of an object at the physical slit plane. So the physical slit can be used for spatially filtering light of the object in the at least one direction, typically the across-slit direction. Specifically, the physical slit can be configured to pass part of the light of the imaged direction of the object fitting through the physical slit, e.g. passing into a spectrometer. The spectral imager may use a combination of imaging optics and a spectral dispersing element, such as a grating or prism, to form a detection image of the light onto a detector plane which is spectrally resolved along a spectral axis. As described herein, a slit homogenizer can be provided to spatially image an aperture stop or pupil plane of the system in the across-slit direction as a virtual slit image. Correspondingly, the forming of the detection image may include spatially imaging the virtual slit image, at least in the across-slit direction, at the detector plane. In essence the virtual slit image may replace aspects of the physical slit as a source for the spectrometer to image, at least in the across-slit direction. By using an image of the aperture stop "AS" virtual slit image, the illumination can be more homogeneous than that of the conventionally used physical slit. In some embodiments, the slit homogenizer may comprise of a small optical component such as a rod lens that is added to a standard spectrometer, with otherwise minor modifications. This may allow to achieve a homogeneous illumination of the spectrometer entrance slit. Such device may provide a improvement e.g. in measurement accuracy and reproducibility.

BRIEF DESCRIPTION OF DRAWINGS

These and other features, aspects, and advantages of the apparatus, systems and methods of the present disclosure will become better understood from the following description, appended claims, and accompanying drawing wherein:

DESCRIPTION OF EMBODIMENTS

Terminology used for describing particular embodiments is not intended to be limiting of the invention. As used herein, the singular forms "a", "an" and "the" are intended to include the plural forms as well, unless the context clearly indicates otherwise. The term "and/or" includes any and all combinations of one or more of the associated listed items. It will be understood that the terms "comprises" and/or "comprising" specify the presence of stated features but do not preclude the presence or addition of one or more other features. It will be further understood that when a particular step of a method is referred to as subsequent to another step, it can directly follow said other step or one or more intermediate steps may be carried out before carrying out the particular step, unless specified otherwise. Likewise it will be understood that when a connection between structures or components is described, this connection may be established directly or through intermediate structures or components unless specified otherwise.

The term "image" or "imaging" as used herein will be understood in its usual meaning as providing a projection reproducing (at least some of) the spatial layout of an object or scene, analogous to how an image of an object or scene is recorded by a camera. It will also be understood that the 'object' being imaged does not need to be a physical object, e.g. the object can itself also be an image of a preceding optical system. For example, as described herein an entrance telescope may produce an image of an object or scene at a slit which image is then (re)imaged by a spectrometer.

Typically, an object in an object plane of a projection system is imaged in a corresponding image plane of the projection system wherein spatial dimensions of the object are projected onto spatial dimensions of the image. Accordingly, at least some of the spatial information of the object may be preserved in the imaging. To emphasize this feature, the term "spatial imaging" may be used. For example, the spatial information may be read out by a sensor by projecting the image onto a plurality of sensing elements (pixels).

For some applications, reference can be made to imaging a particular direction or dimension of an object or scene. It will be noted that an imaging system can have different focal lengths for different (transverse) axes, e.g. using astigmatic optical components including but not limited to cylindrical and/or rod lenses, or corresponding mirrors. Accordingly, an imaging system can have different imaging planes for different directions of the object being imaged. For example, spatial components of an object can be imaged, along one direction, at a specific position or distance from an optical system while the spatial components are imaged at a different position or distance for a transverse direction. In some applications, as described herein, it is found advantageous to spatially image one direction of an object, e.g. along the slit, at a detector while homogenizing or losing any spatial information of the object in the across-slit direction at the detector so that spectral components can be better separated or at least provide homogeneous images at respective locations along the spectral axis on a detector.

General spectroscopy may include projecting spectral components of one spatial location in an object, image, slice, or point onto different spatial locations at a detector plane or line. For example, a dispersing element such as a grating or prism can be used to spatially (angularly) separate different wavelengths or spectral components of the light. Typically, in a spectrometer light may be guided through a narrow spot or slit, wherein the light is then guided by imaging optics via the dispersing element to project a spectrally resolved image of the light spot or slit onto a detector plane. Spectral imaging is a branch of spectroscopy in which a spectrum or at least some spectral information is collected at multiple locations in an image plane. For example, applications may include astronomy, solar physics, planetology, and Earth remote sensing.

Typically, an optical system, such as a telescope, spectrometer, or spectral imager, has an aperture stop limiting the maximum amount of light passing through the entrance and exit apertures of the system via the optical components along the optical path. For example, the aperture stop can be determined by a physical aperture or opening along the optical path, which may include one of the entrance aperture, exit aperture, or intermediate aperture. Alternatively, limited dimensions of optical elements such as mirrors or lenses can determine the aperture stop.

A pupil may be described as an image of the aperture stop. Reference can also be made to a pupil plane which can be described as an image plane where the aperture stop is at the object plane for one or more optical components. The position and extent of a pupil can be determined by the position and extent of the aperture stop "AS" well as optical components which can form an image of the aperture stop along the optical path. When the image is not actually formed along the optical path, this may be referred to as a virtual image or virtual pupil.

An optical system typically has an entrance pupil which can be described as an image of the aperture stop "AS" seen from an entrance side of the telescope system, also referred to as the object side. In other words, the entrance pupil may be described as an image of the aperture stop "AS" seen from an axial point on the object, i.e. through the optical elements of the system which precede the aperture stop. In case there are no optical components between the aperture stop and the telescope entrance, e.g. the entrance aperture forms the aperture stop, the entrance pupil may be defined as coinciding with the entrance aperture.

An optical system typically has an exit pupil defined as an image of the aperture stop "AS" seen from an exit side of the telescope system, also referred to as the image side. In other words, the exit pupil may be defined as the image of the aperture stop "AS" seen from an axial point in the image plane i.e. through the optical elements of the system behind the aperture stop. In case there are no optical components between the aperture stop and the telescope exit, e.g. the exit aperture forms the aperture stop, the exit pupil may be defined as coinciding with the exit aperture.

An optical system can also have an intermediate pupil which can be described as an image of the aperture stop between the entrance pupil and the exit pupil. For example, an intermediate pupil plane can be disposed at one or more positions along the optical path where the aperture stop is imaged or reimaged by one or more optical components between the aperture stop and intermediate pupil. As described herein, the intermediate pupil plane may coincide with the virtual slit plane.

A telecentric optical system, made of e.g. a combination of lenses or mirrors is typically understood as a (compound) lens that has its entrance or exit pupil at infinity; in the prior case, this may produce an orthographic view of the object. This means that the chief rays (oblique rays that pass through the center of the aperture stop) are parallel to the optical axis in front of or behind the system, respectively. An entrance pupil at infinity makes the lens object-space telecentric. An exit pupil at infinity makes the lens image-space telecentric. If both pupils are at infinity, the lens is double telecentric (or bi-telecentric). One way to make a lens telecentric is to put the aperture stop at one of the lens's focal points, or vice versa. For example, an entrance aperture acting as aperture stop placed at a focal distance in front of an entrance telescope makes the telescope image-space telecentric. Telecentric systems may have some advantages e.g. a simplified interface between the telescope and the spectrometer.

The invention is described more fully hereinafter with reference to the accompanying drawings, in which embodiments of the invention are shown. In the drawings, the absolute and relative sizes of systems, components, layers, and regions may be exaggerated for clarity. Embodiments may be described with reference to schematic and/or cross-section illustrations of possibly idealized embodiments and intermediate structures of the invention. In the description and drawings, like numbers refer to like elements throughout. Relative terms as well as derivatives thereof should be construed to refer to the orientation as then described or as shown in the drawing under discussion. These relative terms are for convenience of description and do not require that the system be constructed or operated in a particular orientation unless stated otherwise.

Figure 1A:
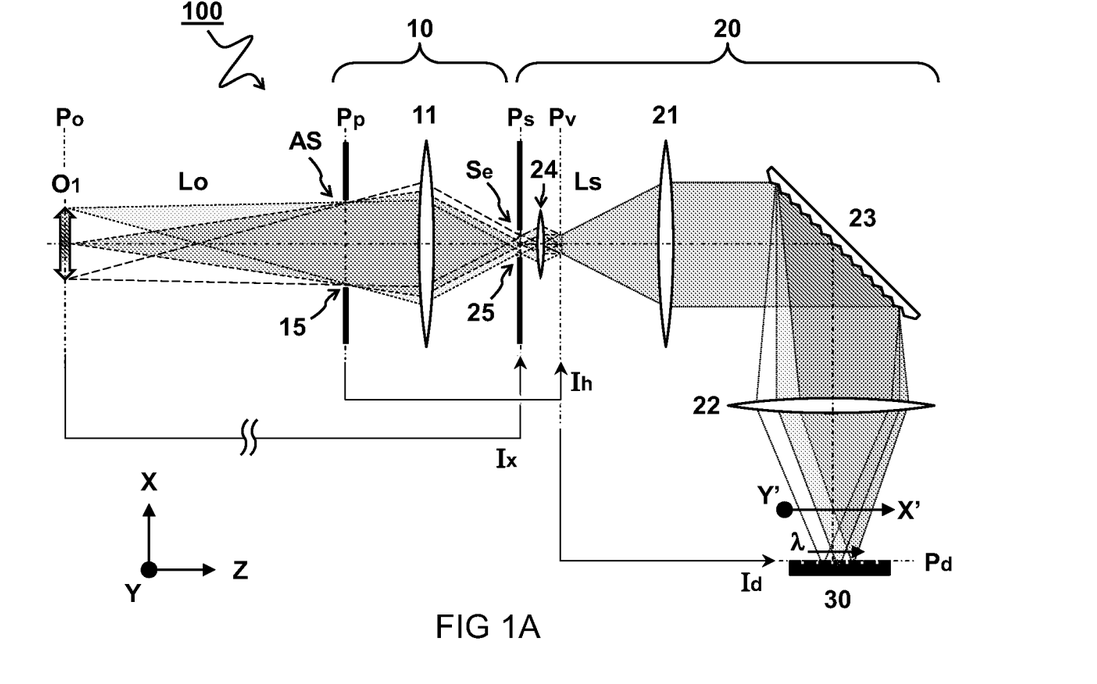
FIG. 1A schematically illustrates a cross-section of a spectral imager viewed in a direction along a length of the slit.

FIG. 1A schematically illustrates a cross-section of a spectral imager 100 viewed in a direction (Y) along a length of the slit "Se". In the embodiment shown, the spectral imager 100 comprises an entrance telescope 10 and a spectrometer 20.

In some embodiments, the spectral imager 100, more specifically the spectrometer 20, comprises a physical slit "Se". For example, the physical slit "Se" can be used for spatially filtering light Ls entering the spectrometer 20. Accordingly, the physical slit "Se" may form a transition between the entrance telescope 10 and the spectrometer 20. In the embodiment shown, the physical slit "Se" is arranged at a physical slit plane "Ps". Typically the physical slit "Se" is narrower in an across-slit direction (X), across a width of the physical slit "Se", than in an along-slit direction (Y), along a length of the physical slit "Se" transverse to the width.

In some embodiments, the spectral imager 100, more specifically the spectrometer 20, comprises a dispersing element 23 for spreading the light Ls entering the spectrometer via the physical slit "Se" as a function of wavelength "λ". Typically, the light is spread along a spectral axis (X') corresponding to the across-slit direction (X). In other or further embodiments, the spectral imager 100 comprises imaging optics 21,22 to form a detection image "Id" of the light Ls. For example, the detection image can be formed onto a detector plane "Pd" which is spectrally resolved along the spectral axis (X') corresponding to the across-slit direction (X).

In some embodiments, the spectral imager 100, more specifically the entrance telescope 10, comprises entrance optics 11 configured to receive object light Lo from an object "O1". In one embodiment, the object or scene can be relatively distant, e.g. as in spectral imager which is part of a satellite orbiting the Earth. For distant objects, e.g. light beams entering the system may be relatively collimated. In other embodiments light beams entering enter the system may be convergent or divergent.

In some embodiments, the entrance optics 11 are configured to spatially image the object "O1", at least in the across-slit direction (X), at the physical slit plane "Ps". In this way a first object image "Ix" can be formed which represent spatial information of the object "O1" at least in the across-slit direction (X). In the embodiment shown, the physical slit "Se" of the spectrometer is configured to pass at least part of the light Ls of the first object image "Ix" fitting through the physical slit "Se" into the spectrometer 20.

In the embodiment shown, the spectral imager 100 has an aperture stop "AS" at a pupil plane "Pp". For example, the entrance optics 11 and/or a physical aperture along a light path through the entrance optics 11 may define the aperture stop "AS" and pupil plane "Pp". In some embodiments, the entrance optics 11 are part of an entrance telescope 10 having a physical entrance aperture configured to pass object light Lo from the object "O1" into the spectral imager 100. In the embodiment shown, the physical entrance aperture defines the aperture stop "AS" (in this case also the entrance pupil), and the pupil plane "Pp" coincides with the position of the physical entrance aperture. Alternatively, the aperture stop "AS" can be defined elsewhere, though preferably somewhere in the entrance telescope 10.

In some embodiments, the spectral imager 100 comprises a slit homogenizer 24. For example, the slit homogenizer 24 can be used for homogenizing light entering the spectrometer 20 via the physical slit "Se". In a preferred embodiment, the slit homogenizer 24 is configured (here together with the entrance optics 11) to spatially image the aperture stop "AS", or at least part of the pupil plane "Pp", in the across-slit direction (X) as a virtual slit image "Ih". In the embodiment shown, the virtual slit image "Ih" is disposed at a virtual slit plane "Pv". In other words, an object plane (in the across-slit direction (X)) of the slit homogenizer 24 and any other optics between the homogenizer and the aperture stop "AS" (such as the entrance optics 11 here), is at the pupil plane "Pp" of the aperture stop "AS" and the corresponding image plane of the slit homogenizer 24 (and said optics) in the across-slit direction (X) coincides with the virtual slit plane "Pv".

In the embodiment shown, the formation of the detection image "Id" by the imaging optics 21,22 and dispersing element 23 includes spatially imaging the virtual slit image "Ih" or virtual slit plane "Pv", at least in the across-slit direction (X), at the detector plane "Pd". In other words an object plane of the imaging optics 21,22 (and dispersing element 23) in the across-slit direction (X) coincides with the virtual slit plane "Pv" and the corresponding image plane of the imaging optics 21,22 in the across-slit direction (X) coincides with the detector plane "Pd". So the detection image "Id" comprises images in the across-slit direction (X) of the virtual slit image "Ih" wherein the images displaced on the detector plane "Pd" along the spectral axis (X') according to wavelength "λ" by the dispersing element 23.

In the embodiment shown, the imaging optics 21,22 and dispersing element 23 are part of a spectrometer 20. In some embodiments, the imaging optics 21,22 comprise collimating optics 21 arranged between the slit homogenizer 24 and the dispersing element 23, and configured to collimate the light from the virtual slit image "Ih" or virtual slit plane "Pv" onto the dispersing element 23. In other or further embodiments, the imaging optics 21,22 comprise focusing optics 22 configured to receive spectrally resolved collimated beams in different directions from the dispersing element 23 and form the detection image "Id" of the spectrally resolved light onto a detector plane "Pd".

In a preferred embodiment, e.g. as shown, the slit homogenizer 24 is arranged between the physical slit "Se" and the imaging optics 21,22. More preferably, the slit homogenizer 24 is arranged between the physical slit "Se" and the collimating optics 21. In the embodiment shown, the slit homogenizer 24 is configured to form, together with the entrance optics 11, the image "Ih" of the entrance aperture (here the apertures stop AS) onto the virtual slit plane "Pv". Most preferably, the collimating optics 21, dispersing element 23, and focusing optics 22 are configured to form the image "Id" of the virtual slit plane "Pv" onto the detector plane "Pd". In addition to imaging the across-slit direction (X) of the object "O1", in some embodiments, the entrance optics 11 may be configured to image also the along-slit direction (Y) of the object to form a second object image "Iy", either at the same position of the physical slit plane "Ps", or at a different position as a second object image "Iy". So the first object image "Ix" may be the same or coincide with the second object image "Iy", or the first and second object images Ix,Iy can be focused at different positions. In a preferred embodiment, formation of the detection image "Id" includes spatially imaging the along-slit direction (Y) at the detector plane "Pd" along a corresponding spatial axis (Y'). Accordingly, spatial information of the object "O1" in the along-slit direction (Y) may be retrieved from the spectral imager 100. For example, the imaging optics 21,22 and dispersing element 23 are configured to form the detection image "Id" onto the detector plane "Pd" spatially resolved along the spatial axis (Y').

In some embodiments, formation of the detection image "Id" may include spatially reimaging an image of the object "O1" in the along-slit direction (Y) produced by the entrance optics 11, wherein the reimaging is again in the along-slit direction (Y) at the detector plane "Pd" along a corresponding spatial axis (Y'). In the embodiment shown, formation of the detection image "Id" may include spatially imaging the physical slit "Se" or corresponding physical slit plane "Ps" in the along-slit direction (Y) at the detector plane "Pd". In such case, the virtual slit plane "Pv" and the along-slit object image "Iy" do not coincide, so the spectrometer may need to be adjusted accordingly with different object planes being imaged at the detector plane "Pd" in transverse directions.

In some embodiments, the spectral imager 100 comprises a light detector 30 with a grid of light sensitive detection elements (pixels) arranged at the detector plane "Pd". For example, the light detector 30 may be integrated in the spectral imager 100 or separate. Also the entrance telescope 10 and spectrometer 20 may be separable in some embodiments. Preferably, the slit homogenizer 24 is integrated in the spectrometer 20 but it may also be separate and/or placed elsewhere with similar effect.

Aspects of the present disclosure may also be embodied as a method for spectral imaging. In one embodiment, the method comprises receiving object light Lo from an object "O1" and spatially imaging the object "O1", at least in an across-slit direction (X), at a physical slit plane "Ps". In another or further embodiment, the method comprises spatially filtering the light using a physical slit "Se" at the physical slit plane "Ps" which is narrower in the across-slit direction (X) than in an along-slit direction (Y). In another or further embodiment, the method comprises spreading the light passing the physical slit "Se" as a function of wavelength "A" along a spectral axis (X') corresponding to the across-slit direction (X). In another or further embodiment, the method comprises forming a detection image "Id" of the light Ls onto a detector plane "Pd" which is spectrally resolved along the spectral axis (X'). In some embodiments, as shown, the light encounters an aperture stop "AS", which is imaged in the across-slit direction (X) as a virtual slit image "Ih". Preferably, formation of the detection image "Id" which is spectrally resolved along the spectral axis (X') includes spatially imaging the virtual slit image "Ih" at least in the across-slit direction (X), at the detector plane "Pd".

Figure 1B:
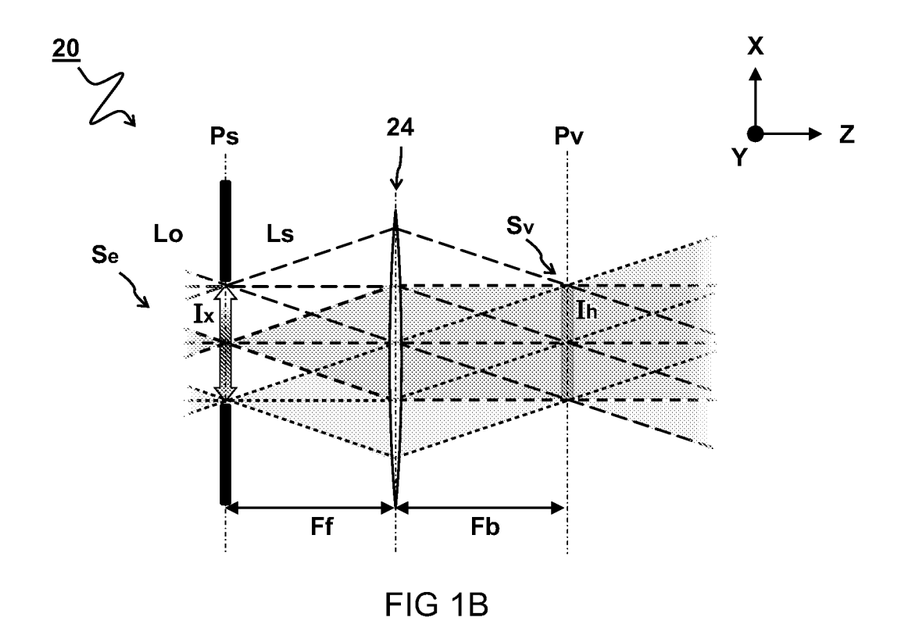
FIG. 1B schematically illustrates light from different parts of an object image entering the slit of a spectrometer and being mixed by a slit homogenizer directly behind the slit.

FIG. 1B schematically illustrates light Ls from different parts of an object image "Ix" entering the slit "Se" of a spectrometer 20 and being mixed by a slit homogenizer 24 directly behind the slit. In some embodiments, as shown, a front focal plane of the slit homogenizer 24 coincides with the physical slit plane "Ps" and a back focal plane of the slit homogenizer 24 coincides with the virtual slit plane "Pv". In other or further embodiments, the slit homogenizer 24 is placed at a distance from the physical slit "Se" corresponding to its front focal length "Ff". In another or further embodiment, the virtual slit image "Ih" is projected at a distance behind the slit homogenizer 24 corresponding to its back focal length Fb. Typically, the front focal length "Ff" and back focal length Fb are equal. Embodiments of the slit homogenizer 24 such as shown may be referred to as telecentric.

Figure 2A:
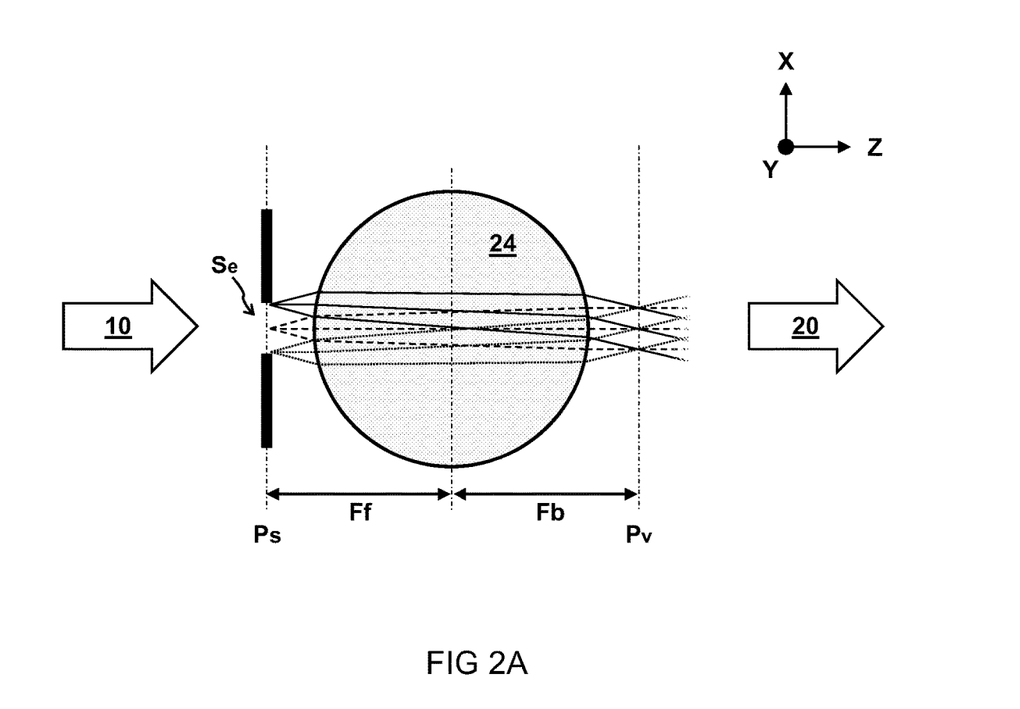
FIG. 2A schematically illustrates a cross-section view of a slit homogenizer embodied as a rod lens.
Figure 2B:
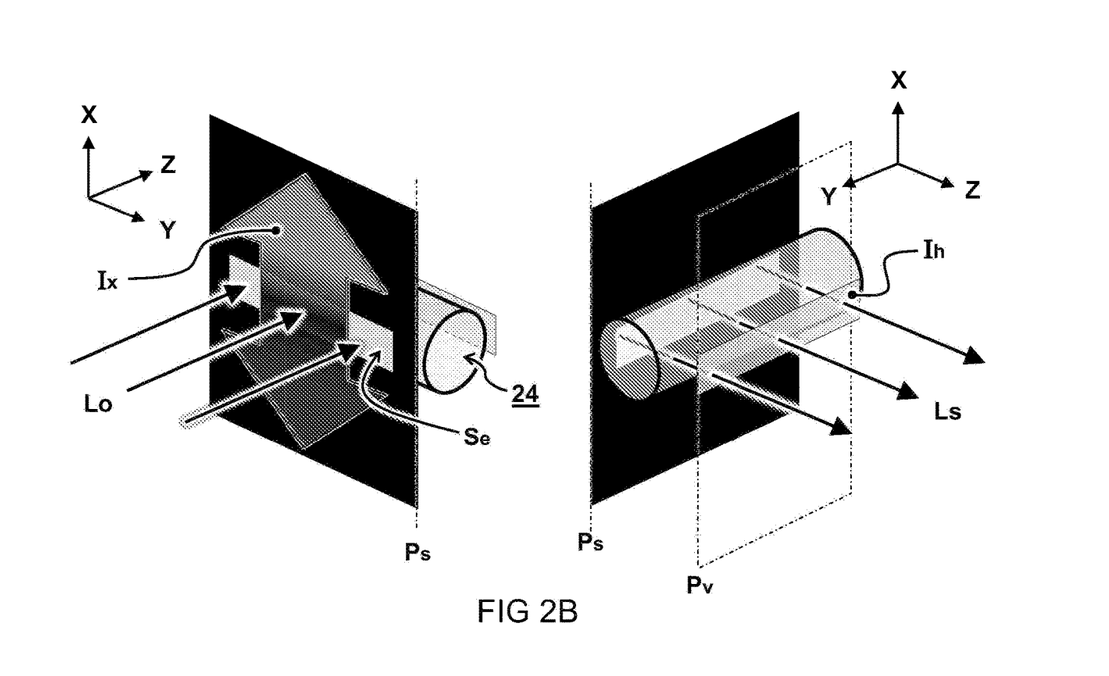
FIG. 2B schematically illustrates perspective views of the rod lens behind the physical slit, viewed from either side of the slit.

FIG. 2A schematically illustrates a cross-section view of a slit homogenizer 24 embodied as a rod lens; FIG. 2B schematically illustrates perspective views of the rod lens behind the physical slit "Se".

In a preferred embodiment, the slit homogenizer 24 comprises a lens having no curvature in the along-slit direction (Y), so only in the across-slit direction (X). In other words, the slit homogenizer 24 preferably only bends the light rays in the across-slit direction (X) which is across the width of slit, or the plane (XZ), and not in the along-slit direction, or the plane YZ. In other or further embodiments, the slit homogenizer 24 is translation symmetric along the along-slit direction (Y) which is along the length of the slit. In other words the shape of the slit homogenizer 24, i.e. its optical surface, is preferably constant in the along-slit direction (Y). For example, the slit homogenizer 24 comprises a cylindrical lens. In a preferred embodiment, the slit homogenizer 24 comprises a rod lens. In that case, a cross-section of the lens in the (X,Z) plane is a disk (circular cross-section). In different embodiments, the lens cross-section can take other shapes if it brings an advantage, e.g. the shape of a plano-convex or bi-convex lens. It will be appreciated that a rod lens may be relatively strong so the virtual slit plane "Pv" can be relatively close to the physical slit plane "Ps". Accordingly, if some adaptation is needed to image the different planes in different directions (X,Y) on the detector plane "Pd", it can be small.

Preferably, the slit homogenizer 24 has a length in the along-slit direction (Y) which is larger than a length of the physical slit "Se". In this way the whole slit may be covered by the homogenizer lens or mirror. Typically, though not necessarily, the length of the slit homogenizer 24 may be more than its height along the across-slit direction (X), e.g. by a factor two, three, five or more.

Figure 3A:
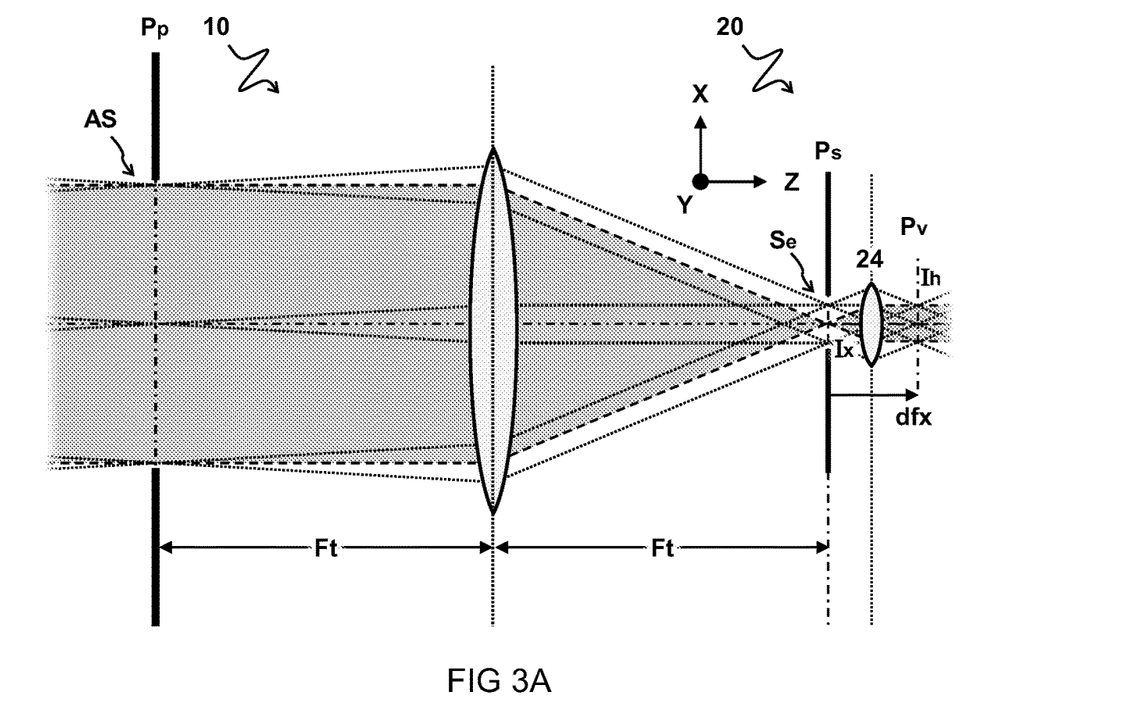
FIG. 3A schematically illustrate one embodiment of an entrance telescope and part of a spectrometer viewed in a direction along a length of the slit.
Figure 3B:
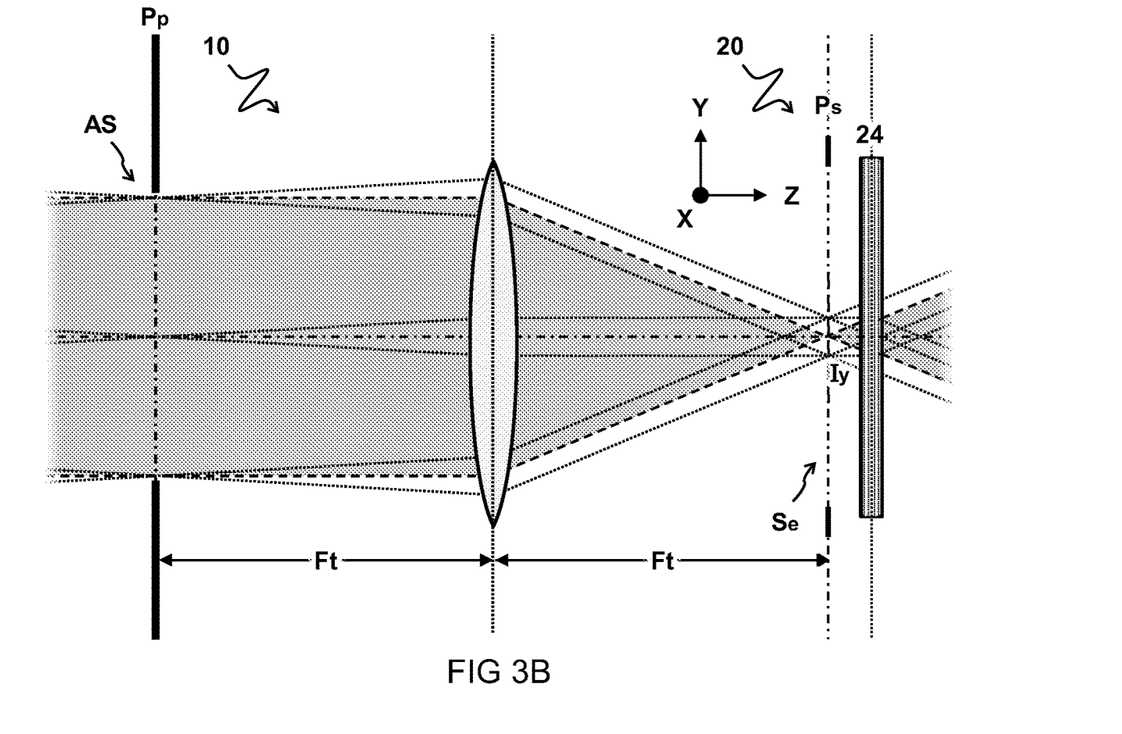
FIG. 3B shows the embodiment of FIG. 3A viewed in a direction transverse to the length of the slit.

FIG. 3A schematically illustrates an embodiment of an entrance telescope 10 and part of a spectrometer 20 viewed in a direction (Y) along a length of the slit "Se". FIG. 3B shows the embodiment of FIG. 3A viewed in a direction (X) transverse to the length of the slit "Se".

In some embodiments, the entrance optics 11 are configured to image also the along-slit direction (Y) of the object "O1" at the physical slit plane "Ps" (indicated in FIG. 3B as the second object image "Iy"). In other or further embodiments, the imaging optics 21,22 and dispersing element 23 are configured to form the detection image "Id" by re-imaging the along-slit direction (Y) of the first object image "Iy" in the physical slit plane "Ps" at the detector plane "Pd" in a corresponding direction (Y)' transverse to the spectral axis (X'). For example, the imaging optics of the spectrometer 20 may be astigmatic (not shown). In the embodiment shown, the object plane of the spectrometer 20 being imaged at the detector plane "Pd" in the across-slit direction (X) coincides with the virtual slit plane "Pv". In the embodiment shown, the object plane of the spectrometer 20 being imaged at the detector plane "Pd" in the along-slit direction (Y) coincides with the physical slit plane "Ps". Advantageously, this embodiment needs minimal or no adaptation of the entrance telescope 10.

Figure 4A:
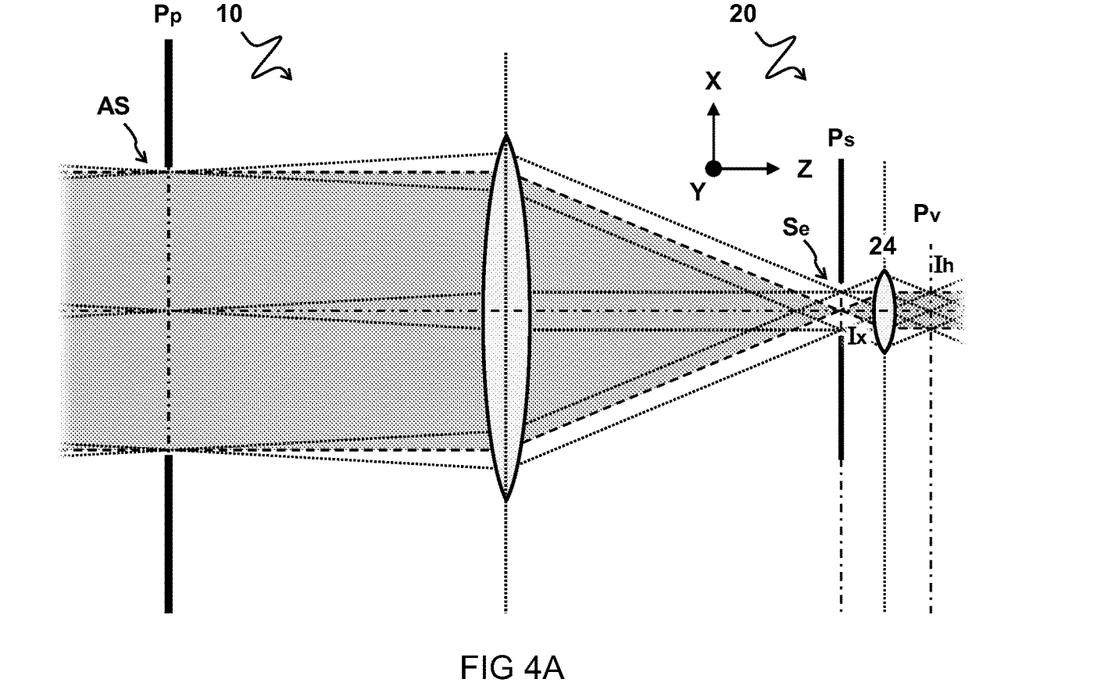
FIG. 4A schematically illustrate another embodiment of an entrance telescope and part of a spectrometer viewed in a direction along a length of the slit.
Figure 4B:
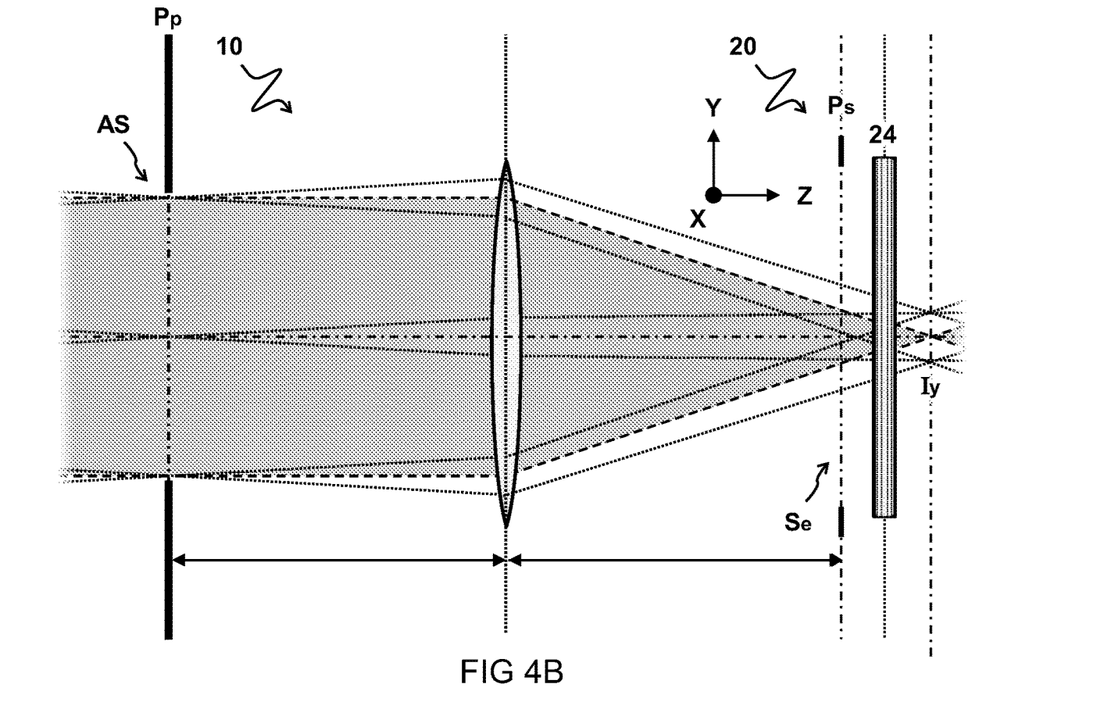
FIG. 4B shows the embodiment of FIG. 4A viewed in a direction transverse to the length of the slit.

FIG. 4A schematically illustrates another embodiment of an entrance telescope 10 and part of a spectrometer 20 viewed in a direction (Y) along a length of the slit "Se". FIG. 4B shows the embodiment of FIG. 4A viewed in a direction (X) transverse to the length of the slit "Se".

In some embodiments, the entrance telescope 10 is configured to image the along-slit direction (Y) of the object "O1" at the virtual slit plane "Pv". In other or further embodiments, the imaging optics 21,22 and dispersing element 23 are configured to form the spectrally resolved detection image "Id" by re-imaging both the first and along-slit directions (X,Y) of the virtual slit plane "Pv" at the detector plane "Pd". For example, the imaging of the entrance telescope 10 may be astigmatic. In the embodiment shown, the image plane of the object being imaged by the entrance telescope 10 in the across-slit direction (X) coincides with the physical slit plane "Ps" and in the along-slit direction (Y) coincides with the virtual slit plane "Pv". Advantageously, this embodiment only needs minimal adaptation of the spectrometer, e.g. moving the slit a bit back and adding the slit homogenizer 24.

In a preferred embodiment, a focal plane of the entrance optics or telescope 10 coincides with the aperture stop "AS". In some embodiments, both the aperture stop "AS" and the physical slit "Se" are arranged at a focal distance from the entrance optics 11. In other words, the pupil plane "Pp" and the physical slit plane "Ps" preferably coincide with the focal planes of the telescope 10. This may also be referred to as a telecentric condition. In the embodiments shown in FIGS. 3A,3B,4A,4B, both the entrance optics of the entrance telescope 10 and the lens forming the slit homogenizer 24 are telecentric, which may be advantageous for some applications. Other or further embodiments, e.g. as will now be described, need not be telecentric.

Figure 5A:
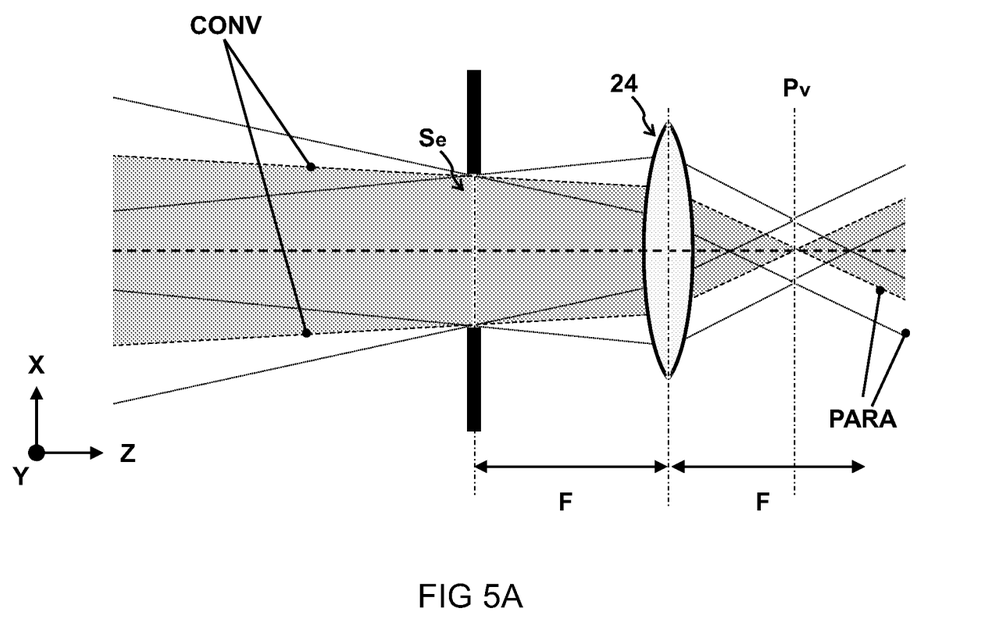
FIG. 5A illustrates an embodiment where beams passing the physical slit are converging.

FIG. 5A illustrates an embodiment where beams passing the physical slit "Se" are converging (indicated by "CONV"). This may indicate e.g. a non-telecentric entrance telescope, e.g. wherein the aperture stop is not at a focal plane of the telescope. In the embodiment shown, the slit homogenizer 24 is placed at its focal distance "F" from the physical slit "Se" and the beams are made parallel indicated by "PARA" as the pass the virtual slit plane "Pv". This configuration can also be referred to a telecentric. It may be noted that the virtual slit plane "Pv" here can be closer to the slit homogenizer 24 than its focal distance "F" e.g. due to the initially converging beams.

Figure 5B:
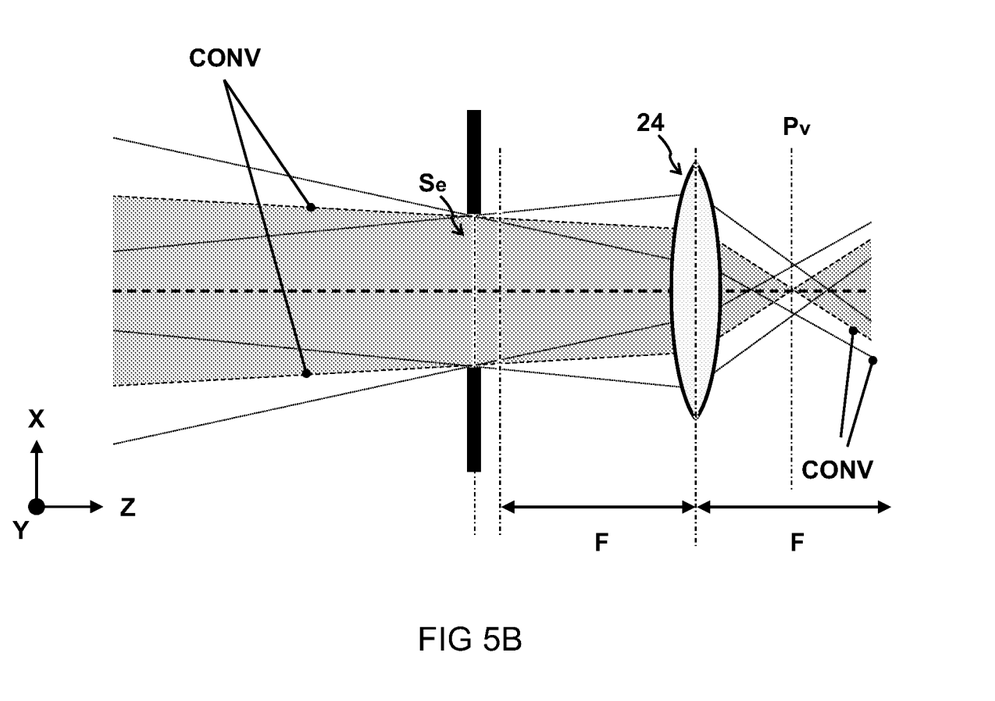
FIG. 5B illustrates another embodiment similar to FIG. 5A, except here the slit homogenizer is not placed at its focal distance.

FIG. 5B illustrates another embodiment similar to FIG. 5A, except here the slit homogenizer 24 is not placed at its focal distance "F". So in this embodiment neither the telescope nor the slit homogenizer 24 is telecentric. It may be noted that the virtual slit plane "Pv" here is even closer to the slit homogenizer 24 and the beams passing the virtual slit plane "Pv" are also converging indicated by "CONY". Also for this embodiment, the imaging optics of the spectrometer (not shown) can be adjusted to image the virtual slit plane "Pv" onto the detector plane "Pd", at least in the across-slit direction.

For the purpose of clarity and a concise description, features are described herein as part of the same or separate embodiments, however, it will be appreciated that the scope of the invention may include embodiments having combinations of all or some of the features described. For example, while embodiments were shown for the homogenizer embodied as a lens behind the slit, also alternative ways may be envisaged by those skilled in the art having the benefit of the present disclosure for achieving a similar function and result. E.g. optical components such lenses, mirrors and the dispersing element may be combined or split up into one or more alternative components having the same optical function. The various elements of the embodiments as discussed and shown offer certain advantages, such as homogenizing a slit. While reference is made herein to a spectral imager which may typically image at least one spatial dimension of an object, it can also be envisaged that the present teachings are applied to a spectrometer which only measures a spectrum without spatial information of the object. Of course, it is to be appreciated that any one of the above embodiments or processes may be combined with one or more other embodiments or processes to provide even further improvements in finding and matching designs and advantages. It is appreciated that this disclosure offers particular advantages to remote sensing applications such as measurement of Earth radiance from space, for scientific or operational (e.g. meteorology) purposes, and in general can be applied for any spectrometer or spectral imager where a more homogeneous illuminated slit in the across-slit direction is desired.

In interpreting the appended claims, it should be understood that the word "comprising" does not exclude the presence of other elements or acts than those listed in a given claim; the word "a" or "an" preceding an element does not exclude the presence of a plurality of such elements; any reference signs in the claims do not limit their scope. Where one claim refers to another claim, this may indicate synergetic advantage achieved by the combination of their respective features. But the mere fact that certain measures are recited in mutually different claims does not indicate that a combination of these measures cannot also be used to advantage. The present embodiments may thus include all working combinations of the claims wherein each claim can in principle refer to any preceding claim unless clearly excluded by context.

The invention claimed is:

1. A spectral imager comprising:
a physical slit for spatially filtering a light, wherein the physical slit is arranged at a physical slit plane, and narrower in an across-slit direction than in an along-slit direction;
a dispersing element for spreading the light passing the physical slit as a function of wavelength along a spectral axis corresponding to the across-slit direction;
imaging optics configured to form a detection image of the light onto a detector plane that is spectrally resolved along the spectral axis; and
entrance optics configured to receive an object light from an object and to spatially image the object, at least in the across-slit direction, at the physical slit plane,
wherein the spectral imager has an aperture stop defined by the entrance optics and/or a physical aperture along a light path through the entrance optics;
wherein the spectral imager further comprises a slit homogenizer formed by a lens or mirror that is translation symmetric in the along-slit direction,
wherein the slit homogenizer is configured to spatially image the aperture stop in the across-slit direction as a virtual slit image; and
wherein formation of the detection image that is spectrally resolved along the spectral axis includes spatially imaging the virtual slit image, at least in the across-slit direction, at the detector plane.

2. The spectral imager of claim 1, wherein the entrance optics are part of an entrance telescope having a physical entrance aperture, wherein the physical entrance aperture defines the aperture stop.

3. The spectral imager of claim 1, wherein the slit homogenizer is arranged between the physical slit and the imaging optics.

4. The spectral imager of claim 1, wherein the imaging optics comprise collimating optics arranged between the slit homogenizer and the dispersing element, and
wherein the collimating optics are configured to collimate the light from the virtual slit image onto the dispersing element.

5. The spectral imager of claim 1, wherein the imaging optics comprise focusing optics that are configured to:
receive spectrally resolved collimated beams in different directions from the dispersing element, and form the detection image of the spectrally resolved light onto a detector plane.

6. The spectral imager of claim 1, wherein a front focal plane of the slit homogenizer coincides with the physical slit plane, and
wherein a back focal plane of the slit homogenizer coincides with the virtual slit plane.

7. The spectral imager of claim 1, wherein a focal plane of the entrance optics coincides with the aperture stop.

8. The spectral imager of claim 1, wherein the slit homogenizer comprises a rod lens.

9. The spectral imager of claim 1, wherein the slit homogenizer has a length in the along-slit direction that is larger than a length of the physical slit,
wherein, a length of the slit homogenizer is more than a height of the slit homogenizer in the across-slit direction.

10. The spectral imager of claim 1, wherein formation of the detection image includes spatially imaging the slit such that light originating from positions arranged along the along-slit direction of the slit is imaged at the detector plane along a corresponding spatial axis.

11. The spectral imager of claim 1, wherein the entrance optics are configured to image the object such that light originating from positions arranged along the along-slit direction of the object is imaged at the virtual slit plane as a first object image, and
wherein the imaging optics and dispersing element are configured to form the spectrally resolved detection image by re-imaging the first object image at the detector plane being spatially resolved in the along-slit direction and spectrally resolved in the across-slit direction.

12. The spectral imager according to claim 1, wherein the entrance optics are configured to image the object such that light originating from positions arranged along the along-slit direction of the object is imaged at the physical slit plane as a first object image, and
wherein the imaging optics and dispersing element are configured to form the detection image by re-imaging the first object image such that light originating from different positions arranged along the along-slit direction of the first object image in the physical slit plane is imaged at the detector plane in a corresponding direction transverse to the spectral axis.

13. A method for spectral imaging comprising:
receiving object light from an object and spatially imaging the object, at least in an across-slit direction, at a physical slit plane
spatially filtering the light using a physical slit at the physical slit plane that is narrower in the across-slit direction than in an along-slit direction;
spreading the light passing the physical slit as a function of wavelength along a spectral axis corresponding to the across-slit direction; and
forming a detection image of the light onto a detector plane that is spectrally resolved along the spectral axis;
wherein the light encounters an aperture stop and is imaged in the across-slit direction as a virtual slit image,
wherein formation of the detection image that is spectrally resolved along the spectral axis includes spatially imaging the virtual slit image at least in the across-slit direction, at the detector plane.

14. The method of claim 13, wherein the entrance optics are part of an entrance telescope having a physical entrance aperture, and wherein the physical entrance aperture defines the aperture stop.

15. The method of claim 13, wherein the slit homogenizer is arranged between the physical slit and the imaging optics.

16. The method of claim 13, wherein the imaging optics comprise focusing optics configured to:
receive spectrally resolved collimated beams in different directions from the dispersing element, and
form the detection image of the spectrally resolved light onto a detector plane.

17. The method of claim 13, wherein a front focal plane of the slit homogenizer coincides with the physical slit plane, and
wherein a back focal plane of the slit homogenizer coincides with the virtual slit plane.

18. The method of claim 13, wherein a focal plane of the entrance optics coincides with the aperture stop.

19. The method of claim 13, wherein formation of the detection image includes spatially imaging the slit such that light originating from positions arranged along the along-slit direction of the slit is imaged at the detector plane along a corresponding spatial axis.

20. The method of claim 13, wherein the entrance optics image the object such that light originating from positions arranged along the along-slit direction of the object is imaged at the virtual slit plane as a first object image, and
wherein the imaging optics and dispersing element form the spectrally resolved detection image by re-imaging the first object image at the detector plane being spatially resolved in the along-slit direction and spectrally resolved in the across-slit direction.

21. The method of claim 13, wherein the entrance optics image the object such that light originating from positions arranged along the along-slit direction of the object is imaged at the physical slit plane as a first object image, and
wherein the imaging optics and dispersing element form the detection image by re-imaging the first object image such that light originating from different positions arranged along the along-slit direction of the first object image is imaged in the physical slit plane at the detector plane in a corresponding direction transverse to the spectral axis.

* * * * *